United States Patent Office 3,312,714
Patented Apr. 4, 1967

3,312,714
PREPARATION OF 2-OXAZOLINES FROM N-(2-HYDROXYETHYL)AMIDES
Allan A. Eisenbraun, Colonial Heights, Va., assignor to Allied Chemical Corporation, New York, N.Y., a corporation of New York
No Drawing. Filed May 13, 1965, Ser. No. 455,635
12 Claims. (Cl. 260—307)

This invention relates to the preparation of 2-oxazolines. 2-oxazoline and 2-substituted-2-oxazolines possess properties that render them useful for a variety of purposes. For example, they exhibit unusual compatibilities for many substances and thus can serve as excellent solvent media therefor or can be satisfactorily blended therewith. In this latter respect, especially with appropriate variation of the substituent in the 2-position, they can be widely adapted as plasticizers for a great many types of resins. Because of their structure, they also find particular applicability as intermediates in the production of various chemical compounds of more or less complexity. In addition, they can be polymerized with opening of the oxazoline ring to form N-acyl polyethyleneimines, which may be processed as fibres or films or may be utilized in the formulation of many different kinds of coating compositions.

Such a 2-oxazoline can be prepared by the cyclodehydration of the corresponding N-(2-hydroxyethyl) amide. This reaction can be effected by subjecting the amide to suitable conditions of temperature and pressure. It has also been variously proposed to carry out the reaction in the presence of a catalyst or a condensing agent. In either case the yield of the desired 2-oxazoline is relatively low, and in many instances there is an undue formation of undesirable high-boiling residual material. Moreover, such thermal cyclodehydration procedure is generally applicable only to the production of 2-lower alkyl-2-oxazolines.

I have now found that, quite unexpectedly, such cyclodehydration of an N-(2-hydroxyethyl) amide can be accomplished with a marked improvement in the yield of the desired 2-oxazoline and a concomitant decrease in the formation of by-product or residual material. This result is obtained by conducting the reaction in the presence of a catalyst comprising a solid inorganic salt of a boric acid at an elevated temperature.

More particularly, in accordance with the invention, an N-(2-hydroxyethyl) amide having the general formula

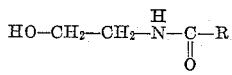

wherein R is hydrogen, an alkyl group, an alkenyl group, an aryl group, an alkaryl group, or an aralkyl group, is contacted with a solid inorganic borate at a temperature of 150 to 500° C. Cyclodehydration of the amide thereby results, with the formation of a 2-oxazoline having the general formula

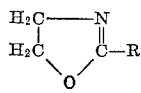

wherein R has the same meaning as above.

Any amide having the indicated general formula may be utilized in carrying out the present reaction. Where R is an alkyl group or an alkenyl group, it may be a straight-chain group or a branched-chain group; or it may have a cyclic structure. Where R is an aryl group, it may be mononuclear or polynuclear. Where R is an alkaryl group or an aralkyl group, similar comments respectively apply to the alkyl portion and to the aryl portion of such a group.

In addition, any such hydrocarbon group may contain a substituent such as a halogen provided that such substituent is not itself reactive and is not rendered reactive by reason of its manner of association with the hydrocarbon group. Accordingly, since such a "substituted" hydrocarbon group thus acts like the corresponding "unsubstituted" hydrocarbon group in the present reaction, the terms "alkyl group," "alkenyl group," "aryl group," "alkaryl group," and "aralkyl group" as used herein include not only the respective hydrocarbon groups per se but also such corresponding "substituted" hydrocarbon groups.

Generally speaking, the best results are obtained when the amide is an N-(2-hydroxyethyl) alkyl amide. Advantageously, the alkyl group contains 1 to 18 carbon atoms; and the use of such an alkyl amide constitutes a preferred embodiment of the present invention. The desired 2-alkyl-2-oxazoline is preparable in especially good yields without difficulty when the alkyl group has 5 to 10 carbon atoms.

The alkyl group may be, for example, a methyl, ethyl, propyl, isopropyl, isobutyl, pentyl, hexyl, cyclohexyl, heptyl, nonyl, undecyl pentadecyl or heptadecyl group. Typical alkenyl groups include the heptadecenyl group and the heptadecadienyl group. The aryl group may not only be a phenyl group or a p-chlorophenyl group but also a polynuclear group such as a naphthyl group. An example of an alkaryl group is the p-tolyl group and an example of an aralkyl group is the benzyl group. Where R is hydrogen, the amide is, of course, N-(2-hydroxyethyl) formamide.

The N-(2-hydroxyethyl) amide may be readily obtained simply by heating ethanolamine and the appropriate R acid or an ester of such acid, with the ethanolamine being used in slight excess. After removal of the resulting water or alcohol by volatilization, the desired amide may be recovered by distillation or stripping of the reaction mixture and may then be purified, if desired, by crystallization from a suitable solvent such as methyl alcohol, acetone, or acetone-hydrocarbon mixture.

The catalyst may comprise any solid inorganic borate or inorganic salt of a boric acid. Such borates include the metaborates, the borates or orthoborates, and the tetraborates or pyroborates. Preferably a solid inorganic metaborate or tetraborate, advantageously an alkali metal or alkaline earth metal metaborate or tetraborate, is utilized. Examples of such borates comprise lithium metaborate, sodium metaborate, sodium tetraborate, potassium metaborate, potassium tetraborate, calcium orthoborate, calcium metaborate, calcium tetraborate, strontium tetraborate, barium metaborate, barium tetraborate, magnesium orthoborate, magnesium tetraborate, zinc tetraborate, and manganese tetraborate. Sodium tetraborate is particularly suitable because of its ready availability in the form of borax.

Ordinarily the borate catalyst is employed in a granular, pelletized, or powdered form. Alternatively it may be coated on a suitable support such as asbestos, glass wool, or granular carbon as by impregnation with an aqueous solution of the borate or by deposition from an aqueous dispersion of the borate. In either case the particulate catalyst is desirably so arranged in the reaction zone as to provide the optimum surface area for contact with the N(2-hydroxyethyl) amide undergoing cyclodehydration.

Many borates, whether they occur naturally or whether they are prepared synthetically, contain more or less water of crystallization. If such a hydrate is used per se as the catalyst, the water of crystallization will be driven off at the elevated temperature at which the present reaction is conducted and will tend to interfere, at least initially, with the desired cyclodehydration of the N-(2-hydroxyethyl) amide. It is preferable, therefore, to effect dehydration of such a borate hydrate prior to its contact with the N-(2-hydroxyethyl) amide undergoing cyclodehydration. Such dehydration will usually be done before the borate catalyst is placed in the reaction zone but may also be done in situ in the reaction zone if desired.

A particular advantage of the use of the present borate catalyst is its higher selectivity. More specifically, it has been found that materially less by-product or high-boiling residual material is formed when a solid inorganic borate is utilized as the catalyst. The result is that not only is there a higher yield of the desired 2-oxazoline obtained but that the reaction can be conducted at a higher over-all efficiency. In this connection separation and recovery of the unreacted N-(2-hydroxyethyl) amide can also be more readily accomplished. Alternatively, if desired, it is also possible to recirculate the entire residue with only an occasional purging of the system when the proportion of residual material becomes too great.

To effect the desired cyclodehydration, the N-(2-hydroxyethyl) amide is brought into contact with the solid inorganic borate catalyst at a temperature between about 150° C. and about 500° C. Below about 150° C., it has been found, the reaction tends to proceed too slowly; and above about 500° C. side reactions resulting in the formation of undesirable by-product or residual material tend to become too predominant. Advantageously the present reaction is carried out at a temperature of 200 to 350° C.

The present reaction is preferably conducted in the vapor phase if at all possible. One way of doing so is to vaporize the N-(2-hydroxyethyl) amide and then pass the resulting vapors through a bed of the borate catalyst maintained at the appropriate reaction temperature. Such procedure is generally satisfactory for the lower boiling amides, which can be readily volatilized. Volatilization of the higher boiling amides, however, is advantageously effected in the presence of an inert diluent gas such as nitrogen in order to avoid any undesirable decomposition of the amide prior to its contact with the borate catalyst.

Alternatively, the reaction may be carried out in the liquid phase as by feeding the amide in liquefied form into a reaction zone containing the borate catalyst. Such operation is readily effected simply by dropping the liquefied amide onto a mass of the catalyst maintained at the desired temperature of reaction. This procedure is particularly useful with those higher boiling amides that are difficultly vaporizable.

Usually the present cyclodehydration reaction is conducted under a vacuum especially if vapor-phase contact of the N-(2-hydroxyethyl) amide with the catalyst is employed. With the lower boiling amides, however, the reaction may be carried out at atmospheric pressure or even at a super-atmospheric pressure. In either case it generally becomes desirable to adjust the pressure of operation so that the resulting 2-oxazoline will remain in the vapor phase or, if necessary, will volatilize so that it can be readily recovered from the reaction mixture that is obtained from the reaction zone. In addition, in the vapor-phase type of operation, the pressure may be varied, if desired, in order to control the time of contact between the amide vapors and the borate catalyst.

As is known, 2 oxazoline and the 2-lower alkyl-2-oxazolines are more or less soluble in water and are thus more or less hydrolyzable. Since water is produced as a result of the cyclodehydration reaction, it is desirable to separate the resulting 2-oxazoline from such water of reaction as soon as possible. One way of accomplishing such recovery of the 2-oxazoline, thereby preventing any material loss of the same, is to dissolve the 2-oxazoline in a water-insoluble solvent such as carbon tetrachloride or chloroform.

The following examples will illustrate the invention:

*Example 1*

A mixture of vaporized N-(2-hydroxyethyl) hexamide (or caproamide) and nitrogen was fed at rates of 15 g./hour and 1.2 liters/hour (measured at standard temperature and pressure conditions), respectively, into a tubular reactor having an inside diameter of 18.5 mm. and a length of 265 mm. and filled with 42 g. of anhydrous sodium tetraborate in the form of ¼-inch granules. Such anhydrous sodium tetraborate had been previously prepared by heating borax at about 150° C. for a time sufficient to drive off the water of crystallization. The reactor was kept at 275° C. under 200 mm. Hg absolute pressure and was connected to an ice-cooled receiver. From 39.3 g. of the N-(2-hydroxyethyl) hexamide passed through the reactor, 38.7 g. of crude product was obtained. Fractional distillation of such crude product at reduced pressure gave 24.38 g. of 2-pentyl-2-oxazoline, boiling point 78–88° C.,/15 mm. Hg, and 8.5 g. of residue. Analysis of such residue by vapor-phase chromatography showed 80.4% of N-(2-hydroxyethyl) hexamide and 1.2% of 2-pentyl-2-oxazoline. These results correspond to a 2-pentyl-2-oxazoline yield of 77.1% and an efficiency for the reaction of 94.6%.

*Example 2*

A mixture of vaporized N-(2-hydroxyethyl) hexamide (or caproamide) and nitrogen was fed at rates of 23 g./hour and 0.48 liter/hour (measured at standard temperature and pressure conditions), respectively, into a tubular reactor having an inside diameter of 18.5 mm. and a length of 265 mm. and filled with 32 g. of granular carbon coated with $Na_2B_4O_7$. Such coated carbon granules has been prepared by impregnating granular carbon with a 10% aqueous solution of borax and then heating the impregnated granules at about 150° C. for time sufficient to dehydrate the borax. The granular carbon was cylindrical in shape and measured about 3/16 inch in diameter and about ⅛ inch in height. The reactor was kept at 283° C. under an absolute pressure of 100 mm. Hg and was connected to an ice-cooled receiver. From 33.0 g. of the N-(2-hydroxyethyl) hexamide passed through the reactor, 32.5 g. of crude product was obtained. Fractional distillation of such crude product at reduced pressure gave 17.01 g. of 2-pentyl-2-oxazoline, boiling point 82–86° C./15 mm. Hg, and 11.31 g. of residue. Analysis of such residue by vapor-phase chromatography showed 81.1% of N-(2-hydroxyethyl) hexamide and 0.18% of 2-pentyl-2-oxazoline. These results correspond to a 2-pentyl-2-oxazoline yield of 63.2% and an efficiency for the reaction of 90.2%.

*Example 3*

In a 50-ml. flask equipped with a thermometer and an addition funnel and connected to a vacuum-distillation assembly was placed 1.05 g. of $Na_2B_4O_7$, which had been previously prepared by heating the corresponding quantity of borax at about 150° C. for a time sufficient to drive off the water of crystallization. The flask was heated to 210–230° C. at 20 mm. Hg absolute pressure; and 23.4 g. of N-(2-hydroxyethyl) p-toluamide was added dropwise over a period of three hours. During such addition of the amide, the product was collected in the receiver in two portions. The first portion amounted to 10.8 g. and had a melting point of 47–60° C.; vapor-phase chromatography showed it to contain 74.0% of 2-(p-tolyl)-2-oxazoline. The second portion amounted to 6.5 g. and had a melting point of 47–63° C.; vapor-phase chromatography showed it to contain 86.8% of 2-(p-tolyl)-2-oxazoline. The resulting yield of 2-(p-tolyl)-2- oxazoline was 13.64 g. or 65%. The crude 2-(p-tolyl)-2-oxazoline was purified by steam distillation; and the resulting pure compound had a melting point of 73° C.

I claim:
1. A method of preparing a 2-oxazoline having the general formula

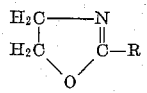

which comprises contacting an N-(2-hydroxyethyl) amide having the general formula

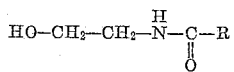

with a solid inorganic borate at a temperature of 150 to 500° C. to effect cyclodehydration of said amide, R in each of the above formulas being a member selected from the class consisting of hydrogen, alkyl groups, alkenyl groups, aryl groups, alkaryl groups, and aralkyl groups.

2. A method according to claim 1, in which the solid inorganic borate comprises a member selected from the class consisting of the solid inorganic metaborates and the solid inorganic tetraborates.

3. A method according to claim 1, in which the N-(2-hydroxyethyl) amide is contacted with the solid inorganic borate at a temperature of 200 to 350° C.

4. A method of preparing a 2-oxazoline having the general formula

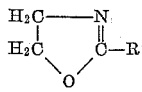

which comprises contacting an N-(2-hydroxyethyl) amide having the general formula

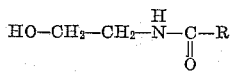

with a solid inorganic borate selected from the class consisting of the alkali metal metaborates, the alkali metal tetraborates, the alkaline earth metal metaborates, and the alkaline earth metal tetraborates at a temperature of 150 to 500° C. to effect cyclodehydration of said amide, R in each of the above formulas being a member selected from the class consisting of hydrogen, alkyl groups, alkenyl groups, aryl groups, alkaryl groups, and aralkyl groups.

5. A method according to claim 4, in which the N-(2-hydroxyethyl) amide is contacted with the solid inorganic borate at a temperature of 200 to 350° C.

6. A method according to claim 4, in which R is an alkyl group having 1 to 18 C atoms.

7. A method of preparing a 2-oxazoline having the general formula

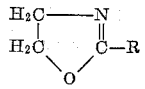

which comprises contacting an N-(2-hydroxyethyl) amide having the general formula

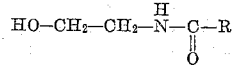

with sodium tetraborate at a temperature of 150 to 550° C. to effect cyclodehydration of said amide, R in each of the above formulas being a member selected from the class consisting of hydrogen, alkyl groups, alkenyl groups, aryl groups, alkaryl groups, and aralkyl groups.

8. A method according to claim 7, in which the N-(2-hydroxyethyl) amide is contacted with the sodium tetraborate at a temperature of 200 to 350° C.

9. A method according to claim 7, in which R is an alkyl group having 1 to 18 C atoms.

10. A method according to claim 9, in which R is an akyl group having 5 to 10 C atoms.

11. A method of preparing 2-pentyl-2-oxazoline, which comprises contacting N-(2-hydroxyethyl) hexamide with sodium tetraborate at a temperature of 150 to 500° C. to effect cyclodehydration of said amide.

12. A method of preparing 2-(p-tolyl)-2-oxazoline, which comprises contacting N-(2-hydroxyethyl) p-toluamide with sodium tetraborate at a temperature of 150 to 500° C. to effect cyclodehydration of said amide.

References Cited by the Examiner

UNITED STATES PATENTS 2,773,738  12/1956  Ball et al. _____ 23—59
2,844,589  7/1958  Hess _____ 260—307.6

OTHER REFERENCES

De Barry et al.: Inorganic Chemistry, Longmans Green, 1953, p. 254.

Jadhav et al.: Chem Abstracts, vol. 45 (1951), columns 10215-6.

ALEX MAZEL, *Primary Examiner.*

HENRY R. JILES, *Examiner.*

RICHARD J. GALLAGHER, *Assistant Examiner.*